(12) United States Patent
Petranovich

(10) Patent No.: US 7,016,371 B1
(45) Date of Patent: Mar. 21, 2006

(54) MULTI-MODE ADAPTIVE FILTER

(75) Inventor: Jim E. Petranovich, Encinitas, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 861 days.

(21) Appl. No.: 09/912,283

(22) Filed: Jul. 24, 2001

(51) Int. Cl.
  *H04L 12/413* (2006.01)
(52) U.S. Cl. ..................... 370/445; 375/232
(58) Field of Classification Search .............. None
  See application file for complete search history.

(56) References Cited

U.S. PATENT DOCUMENTS

| | | | | |
|---|---|---|---|---|
| 4,507,747 A * | 3/1985 | Houdard et al. | ............ | 708/316 |
| 5,203,027 A * | 4/1993 | Nounin et al. | .............. | 455/134 |
| 5,499,268 A * | 3/1996 | Takahashi | ................... | 375/231 |
| 6,778,599 B1 * | 8/2004 | Doron | ........................ | 375/232 |
| 6,870,881 B1 * | 3/2005 | He | .............................. | 375/233 |

* cited by examiner

*Primary Examiner*—Man U. Phan
*Assistant Examiner*—Toan Nguyen
(74) *Attorney, Agent, or Firm*—Farjami & Farjami LLP

(57) ABSTRACT

A multi-mode device, capable of channel equalization and packet collision detection, includes a first switch, which is capable of receiving a transmit signal and a receive signal and outputting a filter input, which is multiplied by a first filter tap to generate a first product. The device also includes a delay unit for receiving the filter input and generating a delayed filter input, wherein the delayed filter input is multiplied by a second filter tap to generate a second product; an adder for adding the first product with the second product and generating a filter output; a decision block, which receives the filter output and generates a decision output; and a second switch capable of receiving the decision output, a training sequence and the receive signal and outputting a second switch output. The device generates an error signal using the filter output and the second switch output.

13 Claims, 7 Drawing Sheets

MULTI-MODE ADAPTIVE FILTER

BACKGROUND OF THE INVENTION

1. Field of the Invention

The present invention generally relates to computer networks and more particularly to channel equalization and collision detection in computer networks.

2. Related Art

Today, computer networks, such as local area network ("LAN") 101, shown in FIG. 1, are utilized to connect numerous devices. For example, LAN 101 may be used to connect several devices, such as personal computer 102, printer 106, personal digital assistant ("PDA") 104, and laptop 108. LAN 101 provides a broadcast channel, which is shared by all devices capable of communication via LAN 101.

When a communications network, such as LAN 101 has many devices connected to one another, the devices may interfere with signals intended for another device in the network and, for example, may echo such signals. For instance, when personal computer 102 sends signal 110 to an intended receiver, for example, laptop 108, signal 110 is sent over a transmission medium, for example, home telephone line. The transmission medium for LAN 101 is a broadcast channel, in which other connected devices, such as PDA 104 may receive the signal, as shown by signal 112. As with any electrical transmissions circuit, if an impedance mismatch exists between the transmission medium and PDA 104, then signal 112 may be reflected, as shown by signal 114. Accordingly, signal 116 would contain reflections when it reaches laptop 108, and such reflections or echoes may cause errors in the signal received by laptop 116, which would increase the number of transmission errors.

Another common source of signal distortion is intersymbol interference ("ISI"), which is typically caused by the transmission medium of LAN 101. Typical wired transmission media, such as the twisted pair phone wiring used in LAN 101, have frequency dependent dispersion, and thus are typically band-limited. According to known digital communications theories, a band-limited transmission medium effectively disperses transmitted symbols in time. In other words, if an impulse signal is sent through a band-limited transmission medium it will be dispersed in time when it is received. ISI occurs when the impulse response of a band-limited transmission medium is longer in duration than the duration between transmitted symbols.

To mitigate the distortive effects of ISI and echoes, an adaptive equalizer may be used. Adaptive equalizers can accommodate time-varying conditions of transmission medium. Also, an adaptive equalizer can estimate a model of the distortive effects of ISI and echoes in the transmission medium. Once an accurate model of the interference is ascertained, the adaptive equalizer may undo the distortive effects of the transmission medium.

Furthermore, a major source of transmission problems in a broadcast channel is caused by the ability of each device to transmit autonomously. In other words, multiple devices may transmit packets simultaneously and, consequently, disrupt each other's transmission. For instance, since the transmission medium for LAN 101 is a broadcast channel, when personal computer 102 sends signal 110 to laptop 108, PDA 104 may simultaneously transmit a signal to printer 106. When two or more network devices begin transmitting signals on the transmission medium at the same time, a contention will occur. Such contentions are typically referred to as packet collisions. Packet collisions reduce the overall throughput of LAN 101, since the transmissions from each network device must be resent.

Conventionally, several different methods are used to reduce packet collisions. For example, in some existing systems, if a first device detects that a second device is using the transmission medium, then the first device will wait until the second device finishes its transmission. According to 802.3 Institute of Electronics and Electrical Engineers ("IEEE") standard, i.e. Ethernet standard, the first device waits for a delineating event, which is the end of the packet of the second device. After such delineating event, the first device further waits a pseudo-random amount of integer slots periods for up to two (2) slot periods, in which a slot period is a specific fixed amount of time for the Ethernet standard. If a packet collision occurs again on the next attempt, the range is increased from two (2) slot periods to four (4) slot periods, so that the device will wait from one (1) to four (4) time slots to transmit again. The range doubles each time, but stops increasing at 1024 time slots. In addition to the techniques employed to avoid subsequent packet collisions by delaying transmission, some implementations may require devices to detect packet collisions and to cease any concurrent transmission upon detecting a packet collision.

There are several methods for detecting packet collisions. One method is to subtract the device's own transmit signal from the aggregate receive signal, so that a device can then detect signal energy caused by interfering devices. For example, in FIG. 2, network device 200 may send transmit signal 202, which is sent through a channel modeled by channel distortion 204. Channel distortion 204 may include several types of distortion, such as ISI or echoes, which give rise to distorted signal 206. In addition to the distortion caused by channel distortion 204, transmit signal 202 may encounter additive noise 208, which may arise from electromagnetic noise sources, such as spark plug ignition or radio interference. Additive noise 208 can be typically modeled as a zero mean Gaussian noise source. If another device is transmitting at the same time, distorted transmit signal 210 is added to an interfering signal 220, which is originated from interferer 214. The transmission of interferer 214 may also encounter sources of distortion and noise, such as channel distortion 216 and additive noise 218. In general, interfering signal 220 can be modeled as a linear interference. In other words, interfering signal 220 can be added to distorted transmit signal 210, as shown conceptually by adder 212. As a result, receive signal 222 contains distorted transmit signal 210 as well as interfering signal 220. Since receive signal 222 can be distorted by interfering signal 220, receive signal 222 may not be received reliably. If a packet collision is not detected until after transmission of a packet is finished, then network throughput can be degraded because of the need for retransmission of a whole packet.

To ensure reliable communications and increase network throughput, some LAN architectures may utilize adaptive equalizer 300 of FIG. 3 to also detect packet collisions. Network device 200 typically contains adaptive equalizer 300, which is normally used for removing distortion from a receive signal from other devices. Adaptive equalizer 300 isolates interfering signal 220 by taking an equalized output and subtracting from transmit signal 202, wherein the equalized output will ideally approximate transmit signal 202. Thus, interfering signal 220 can be isolated, albeit distorted since the adaptive equalizer 300 removes channel distortion 204 and not channel distortion 216 that was experienced by interfering signal 220. Nonetheless, if an interferer 214 is present, the isolated interference signal will contain energy then a collision can be detected and network device 200 stops sending transmit signal 202. However, if the filter taps of the adaptive equalizer are not adequately adapted, then interfering signal 220 may not be reliably isolated, thus making the detection process unreliable.

In operation, as shown in FIG. 3, adaptive equalizer 300 is presented with a receive signal to filter input 306. Filter input 306 is then multiplied by filter tap 308 by way of multiplier 310. Output of unit delay 312 is multiplied by filter tap 314 by way of multiplier 316. The products from multiplier 310 and 316 are added by adder 318. After the last accumulation, filter output 320 is produced. Next, filter error 332 is determined by taking the difference between filter output 320 and a desired signal. The desired signal can be a training sequence 336, such as a preamble, or decision output 326. Either desired signal can be selected by switch 334. The difference between filter output 320 and switch output 328 is determined by way of adder 330. Error signal 332 is then used to update filter taps 380. Also, after filter output 320 is computed, filter input 306 is stored in delay-line 384.

The desired signal in this case is a training sequence that appears at the beginning of the packet. For example, the transmitter and receiver may share a common known sequence. In such a scheme, the transmitter transmits the common sequence to the receiver. The receiver knows exactly how the unperturbed sequence should appear before being disturbed by the channel. This gives adaptive equalizer 300 a reference to estimate the distortion. Using a known sequence to undo the distortive effects of transmission medium of LAN 101 is a common bootstrapping method used in digital communications, commonly known as a preamble.

However, an adaptive equalizer, such as adaptive equalizer 300, which is generally present in network device 200 to equalize the channel, have many drawbacks for detecting packet collisions. Although adaptive equalizer 300 can be used to digitally subtract the transmit signal from the receive signal, adaptive equalizer 300 requires a training sequence to estimate channel distortion 204 and such training may require a very long duration, which duration could be longer than the required time for a device to react to a packet collision, as dictated by system requirements. Accordingly, adaptive equalizer 300 substantially suffers from lack of swiftness in reacting to detection of packet collisions.

Accordingly, there is an intense need in the art for designs and methods of detecting packet collisions, which provide swift and reliable packet collision detection as well as cost-effective, less complex and memory-efficient implementations.

SUMMARY OF THE INVENTION

In accordance with the purpose of the present invention as broadly described herein, there is provided methods and devices for echo cancellation to detect packet collision and for channel equalization. In one aspect of the present invention, a device includes a first switch, which is capable of receiving a transmit signal and a receive signal and outputting a filter input. The filter input is then multiplied by a first filter tap to generate a first product. The device also includes a delay unit for receiving the filter input and generating a delayed filter input, wherein the delayed filter input is multiplied by a second filter tap to generate a second product. The device further includes an adder for adding the first product with the second product and generating a filter output. The device also comprises a decision block, which receives the filter output and generates a decision output, and a second switch capable of receiving the decision output, a training sequence and the receive signal and outputting a second switch output. The device generates an error signal using the filter output and the second switch output.

In one aspect, the device functions as an echo canceler to detect packet collisions. In such mode, the first switch outputs the transmit signal and the second switch outputs the receive signal. In an additional aspect, the error signal is used to generate a peak error and an error energy. In that event, a packet collision is declared if said peak error is higher than a peak error threshold and/or error energy is higher than an error energy threshold.

In another aspect, the device functions as a channel equalizer. In such mode, the first switch outputs the receive signal and the second switch outputs the training sequence or the decision output.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

It should be appreciated that the particular implementations shown and described herein are merely exemplary and are not intended to limit the scope of the present invention in any way. For example, although the present invention is described using computer networks, it should be noted that the present invention may be implemented in other communication systems and is not limited to computer networks. Indeed, for the sake of brevity, conventional data transmission and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
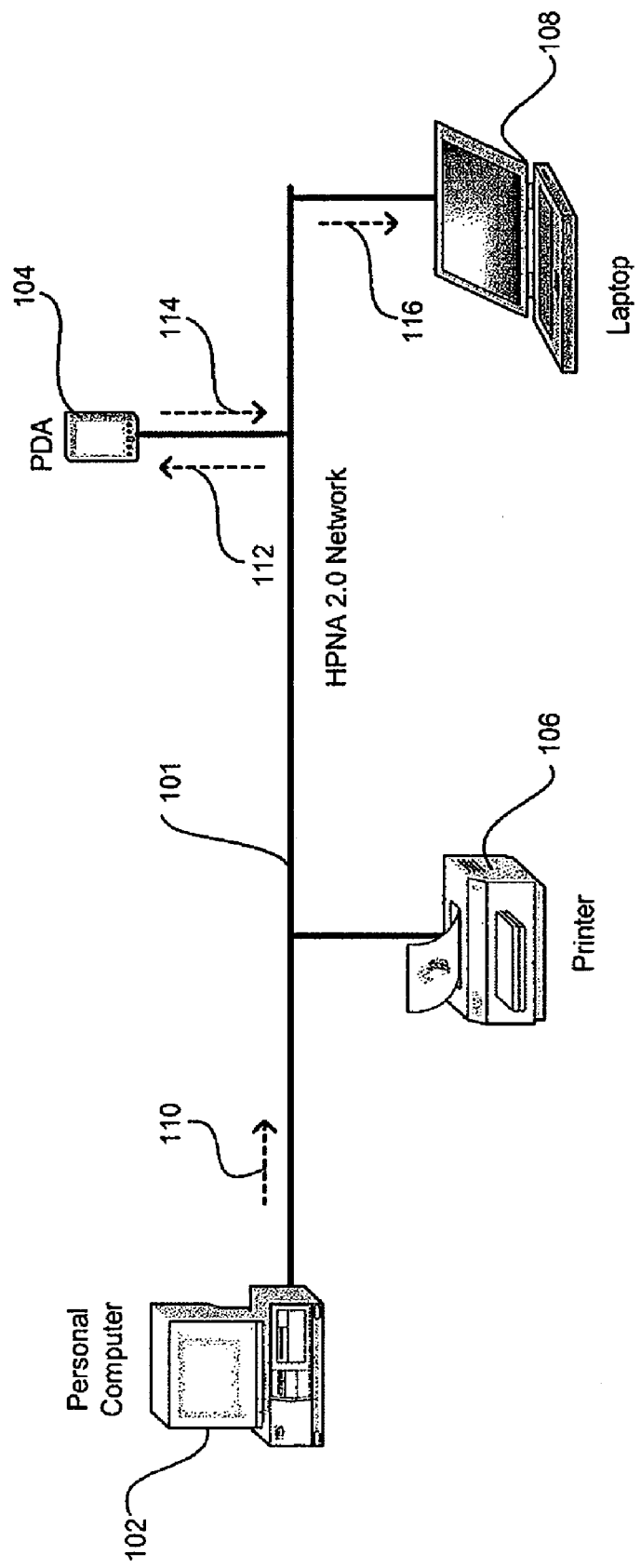
FIG. 1 illustrates an exemplary communications network.
Figure 2:
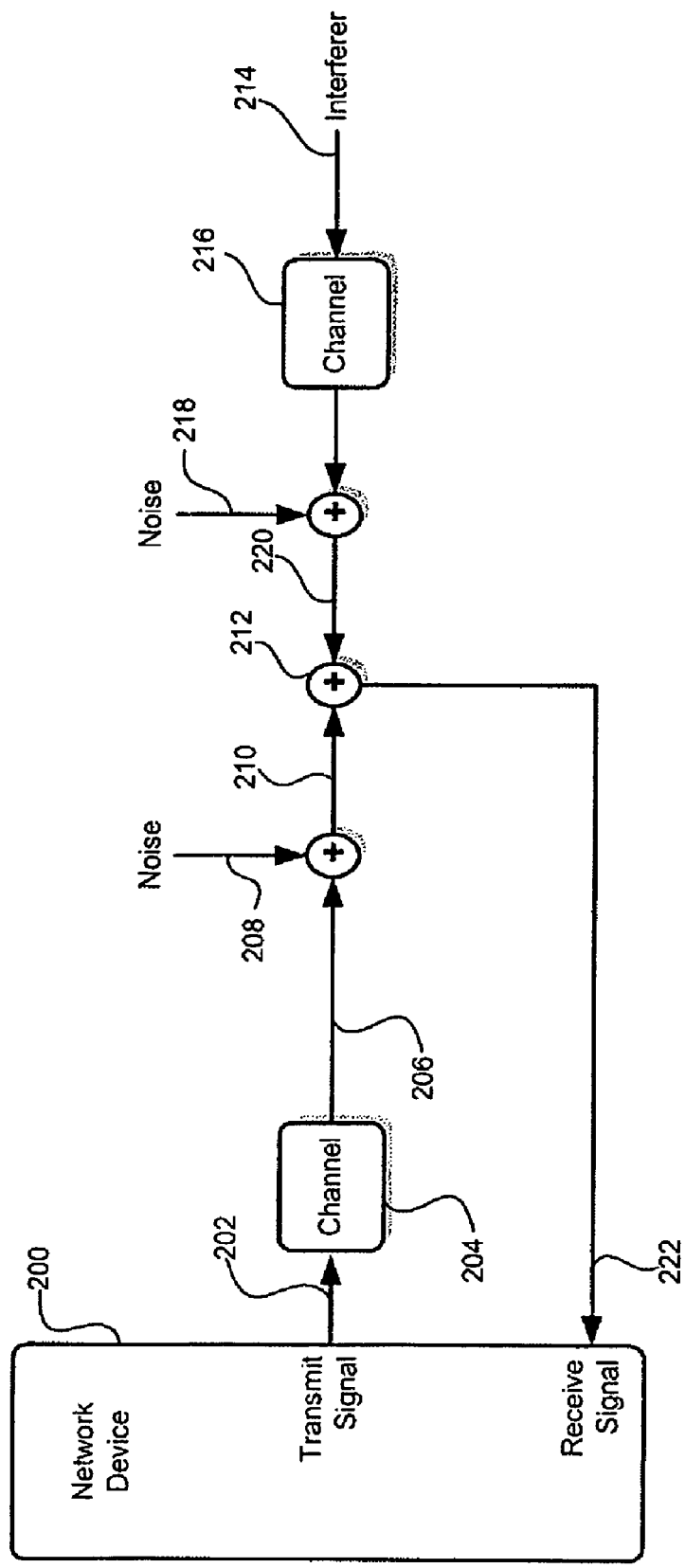
FIG. 2 illustrates an exemplary network device in an exemplary network environment with sources of noise and interference causing signal distortions.
Figure 3:
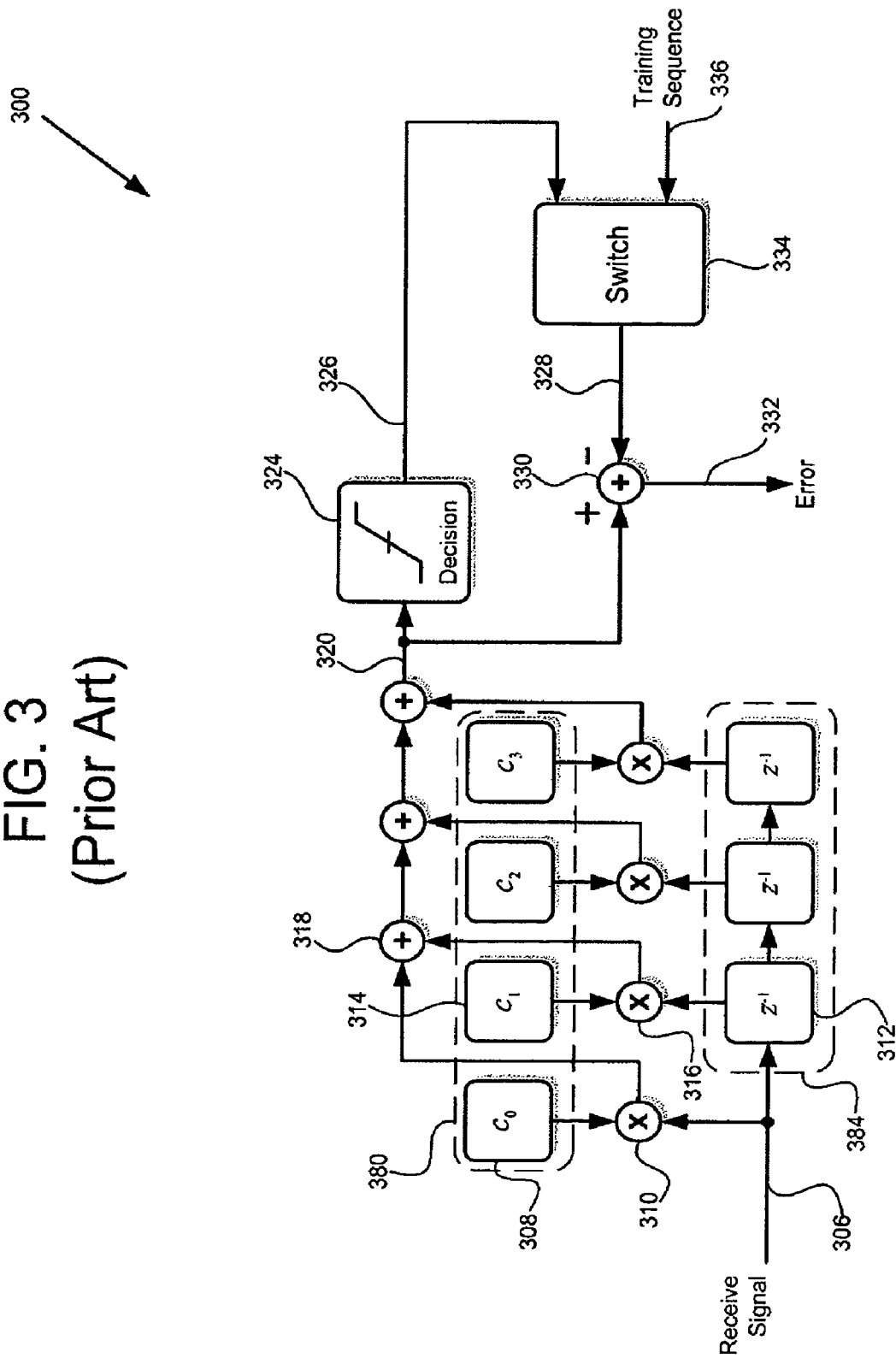
FIG. 3 illustrates an exemplary block diagram of an adaptive equalizer.
Figure 4:
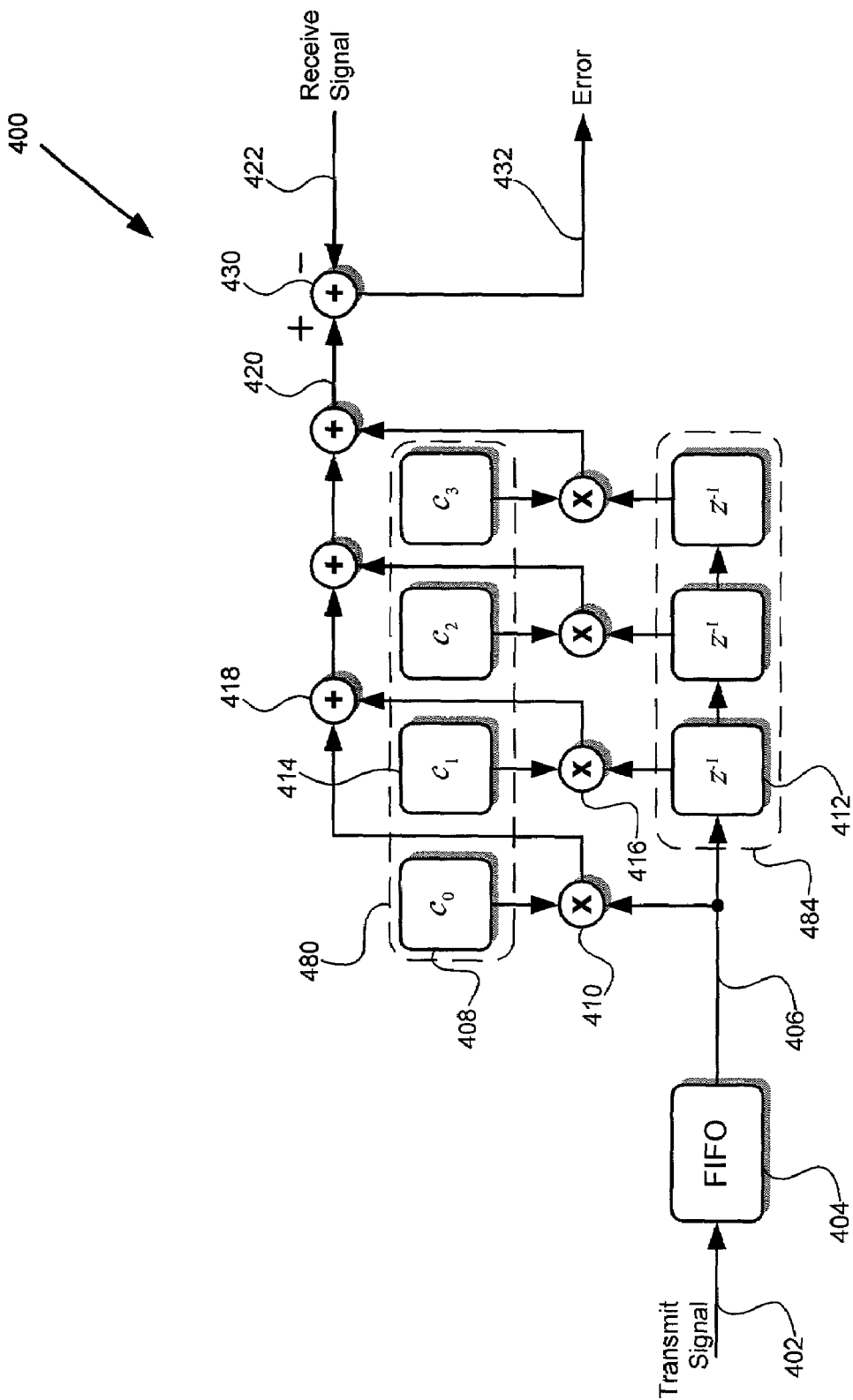
FIG. 4 illustrates an exemplary block diagram of an echo canceler.

Referring to FIG. 4, in one embodiment of the present invention, echo canceler 400 is used for modeling channel distortion 204 and packet collision detection. Echo canceler 400, as contained in network device 200 of FIG. 2, attempts to remove any echoes from a receive signal, wherein the echoes originate from transmitting signal 202 of network device 200. When network device 200 sends transmit signal 202, network device 200 accepts receive signal 222. Receive signal 222 contains a distorted echo of transmit signal 202, which is distorted transmit signal 210. Network device 200 may contain an echo canceler to remove distorted transmit signal 210, thus isolating interfering signal 220.

Similar to adaptive equalizer 300, echo canceler 400 uses an adaptive filter. However, echo canceler 400 uses an adaptive filter for estimating channel distortion 204, rather than estimating an inverse of channel distortion 204 as in adaptive equalizer 300. By using an estimate of channel distortion 204, the echo canceler then filters a copy of transmit signal 202 through the estimate. The output of filter, in general, will produce something very similar to the echo. The echo canceler then subtracts the estimated echo from the receive signal to produce an echo free signal.

FIG. 4 illustrates an exemplary echo canceler 400 with 4-taps. Echo canceler 400 may have more taps depending on the longest anticipated delayed echo. Transmit signal 402 is first stored in a first-in first-out ("FIFO") buffer 404. The operations of receiver components and transmitter components of network device 200, in general, may not synchronized. As such, some sort of buffering may be required. Network device 200 accesses a sample from FIFO buffer 404 to produce filter input 406. Filter input 406 is multiplied by filter tap 408 by way of multiplier 410. Output of unit delay 412 is multiplied by filter tap 414 by way of multiplier 416. The products from multiplier 410 and 416 are added by adder 418.

Multiplication and addition operations can be rapidly computed by using a multiply-and-accumulate ("MAC") type operation commonly found in a digital signal processor ("DSP"). A MAC operation allows a multiplication of a delay input and a filter tap and simultaneously accumulates the product from a previous multiplication, all within a processor clock cycle. Architectures using highly paralleled instructions are commonly found on most off-the-shelf commercial DSPs or licensable DSP cores.

The multiplication and accumulation operations are repeated for the length of the filter, i.e. the remaining taps in the filter. After the last accumulation, filter output 420 is produced. Next, filter error 432 is determined by taking the difference between filter output 420 and a desired signal. In the case of echo canceler 400, the desired signal is the signal modeled by the echo canceler, namely receive signal 422. The difference between filter output 420 and receive signal 422 is determined by way of adder 430. Error signal 432 is then used to update filter taps 480. Also, after filter output 420 is computed, filter input 406 is stored in delay-line 484 for the next filter input 406.

Also, after filter output 420 is computed, filter taps 480 are updated by an adaptive algorithm. The update process for the adaptive filter may use one of many existing adaptive algorithms. An appropriate adaptive algorithm can vary from system to system. Typically, an adaptive algorithm is determined based on system requirements and system constraints. For example, if complexity is a concern for the system, then a low complexity adaptive algorithm, such as the least mean square ("LMS"), can be used. The LMS adaptive algorithm uses the difference between filter output 420 and receive signal 422 to produce error signal 432. The update of filter tap 408 is determined by taking error signal 432 and multiplying it by filter input 406. The product of error signal 432 and filter input 406 is then multiplied by a step parameter. Step parameter is chosen to be between zero (0) and two (2) divided by the tap-input power, where the tap-input power is defined as $$\sum_{k=0}^{M-1} E[|u(n-k)|^2],$$

where M is the tap length, u(n) is the nth element of tap-input vector, and E[.] is the expectation operation. The product is then added to the previous value of filter tap 408 to obtain the new value of filter tap 408.

The update of filter tap 414 is determined similarly by taking error signal 432 and multiplying it by output of unit delay 412. The product of error signal 432 and output of unit delay 412 is then multiplied by the step parameter. The product is then added to the previous value of filter tap 414 to obtain the new value of filter tap 414. The update is similar for the remaining taps of filter taps 480.

At initialization, i.e. when network device 200 is first powered on, filter taps 480 may be initialized to zero (0). After transmission, filter taps 480 may be stored for the initial tap setting for the next transmission. By saving the values of filter taps 480, echo canceler 400 begins adapting from a near optimal set of coefficients for the next transmission. Thus, saving filter taps 480 improves the reliability of echo canceler 400 over time.

Adaptive equalizer 300 and echo canceler 400 are similar in that they undo the effects of channel distortion 204; however, they perform that task differently. As stated above, an adaptive equalizer estimates an inverse of channel distortion 204, so that filter output is undistorted. The adaptive equalizer then subtracts transmit signal 202 from adaptive equalizer output. Thus, interfering signal 220 is isolated from receive signal 222. An echo canceler, on the other hand, estimates channel distortion 204 directly, in order to produce a copy of the echo that will be subtracted from receive signal 222. Thus, interfering signal 220 is also isolated from receive signal 222. However, echo canceler 400 is more apt for modeling channel distortion 204, since it uses transmit signal 402 instead of decision data or a preamble. Thus, echo canceler 400 is well suited for collision detection during signal transmission. Adaptive equalizer 300, on the other hand, is well suited for signal reception because it is designed specifically for undoing channel effects from receive signals.

It is therefore desirable for network device to comprise an adaptive equalizer and an echo canceler, wherein the adaptive equalizer is used for signal reception and the echo canceler is used for collision detection during signal transmission. Both adaptive equalizer and echo canceler comprise filter taps, a delay line, an input signal, an error signal and an adaptive algorithm for adapting filter taps. In one embodiment of the present invention, network device 200 may be designed to utilize common components of the adaptive equalizer to construct an echo canceler and vice-versa. In another embodiment, network device 200 may configure an adaptive filter to function as an echo canceler during signal transmission for detecting packet collisions or may configure the adaptive filter to function as an adaptive equalizer during signal reception.

Figure 5:
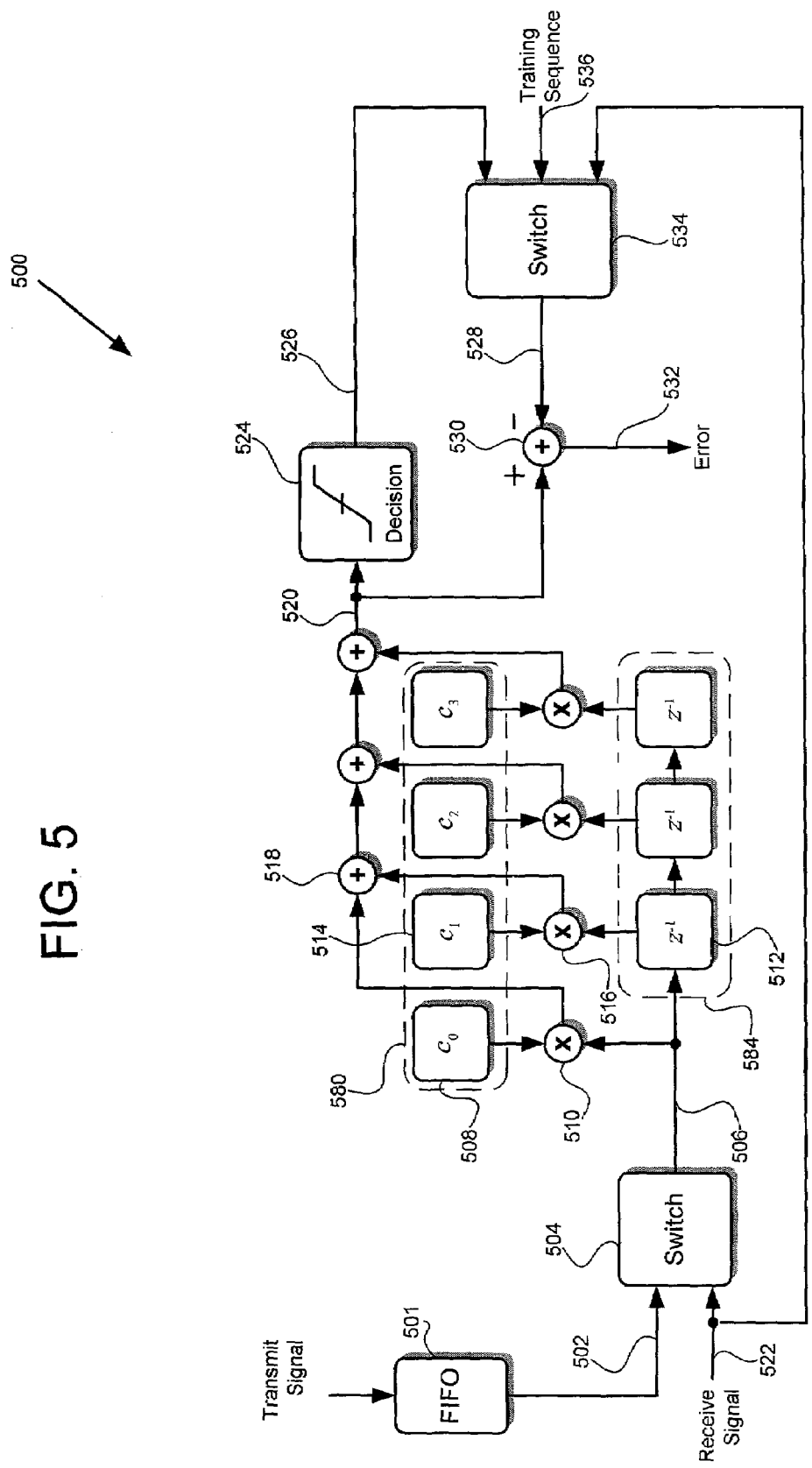
FIG. 5 illustrates an exemplary block diagram of an adaptive filter.

FIG. 5 illustrates adaptive filter 500 that can be used as an adaptive equalizer and/or echo canceler. Depending on the intended operation of network device 200, adaptive filter 500 can be configured to function as an adaptive equalizer or an echo canceler. Adaptive filter input 506 is multiplied by filter tap 508 using multiplier 510. Adaptive filter input 506 is also provided to unit delay 512 and output of unit delay 512 is multiplied by filter tap 514 using multiplier 516. Adder 518 adds the products from multipliers 510 and 516. The multiplication and accumulation operations are repeated for the length of the filter, i.e. the remaining filer taps 580 and delay-line 584. After the last accumulation, adaptive filter output 520 is produced. When adaptive filter 500 is configured as an adaptive equalizer, adaptive filter 500 uses decision block 524 to produce decision-directed filter adaptation, a commonly used technique in adaptive equalization applications. Decision block 524 quantizes adaptive filter output 520 to the most likely received symbol to produce decision output 526. An example of decision block 524 for equally probable antipodal symbols would be a slicer with a decision threshold positioned at the mean value of the two symbols. Decision output 526 is one of the outputs that may be used in determining error signal 532. The difference between filter output 520 and switch output 528 is determined by way of adder 530.

Error signal 532 can be determined in several different methods. Depending on the type of operation, network device 200 controls the type of output 528 of switch 534. In determining error signal 532, an adaptive equalizer uses either training sequence 536, such as a preamble, or decision output 526 after training sequence 536 ends. Thus, network device 200 configures switch 534 to output either 536 or decision output 526 when adaptive filter 500 is configured as an adaptive equalizer. When adaptive filter 500 is configured as an echo canceler, adaptive filter 500 uses receive signal 522 in determining error signal 532. Thus, network device 200 configures switch 534 to output receive signal 522 when adaptive filter 500 is configured as an echo canceler.

Also, depending on the operation of network device 200 filter, adaptive filter input 506 can vary. Network device 200 uses switch 504 to control the different types of input to adaptive filter 500. When adaptive filter 500 is configured as an adaptive equalizer for channel equalization, i.e. mitigating effects of ISI and echoes, network device 200 controls switch 504 to output receive signal 522. When adaptive filter 500 is configured as an echo canceler, network device 200 controls switch 504 to output delayed transmit signal 502. Delayed transmit signal 502 is in turn outputted by FIFO buffer 501. FIFO buffer 501 may be used, because the operation of the transmit and receive components of network device 200 may not be synchronized. In another embodiment, FIFO buffer 501 may be removed if a transmit and receive components of network device 200 are synchronous.

Figure 6:
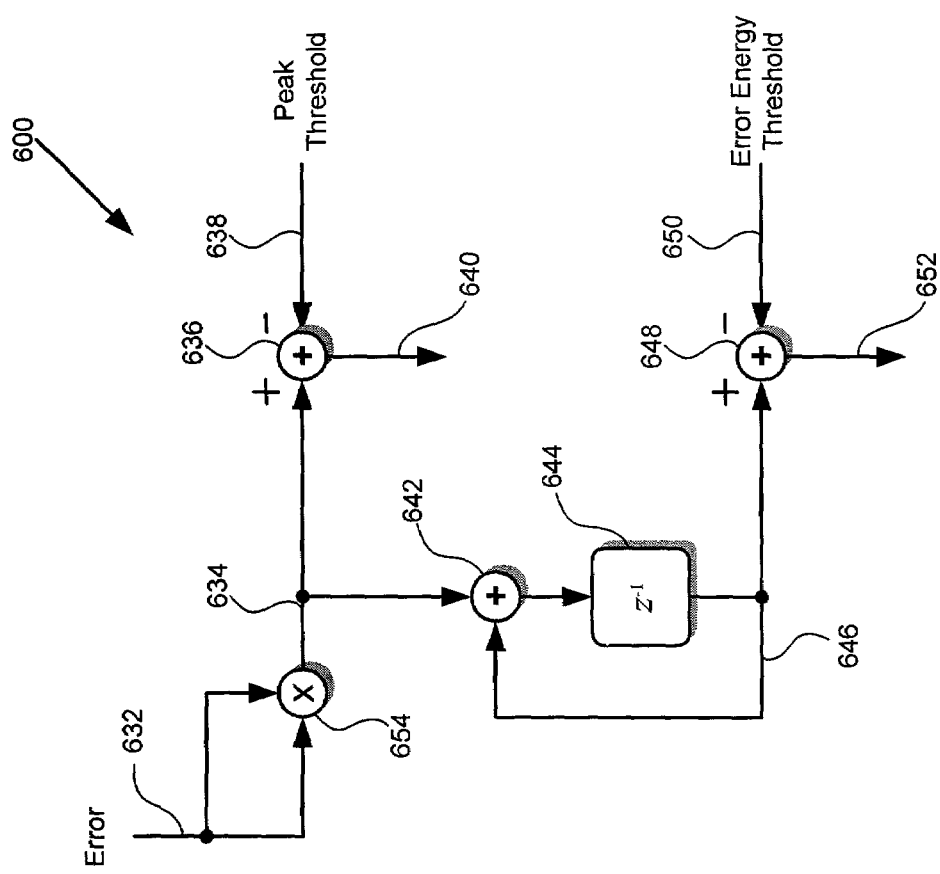
FIG. 6 illustrates an exemplary block diagram of a packet collision logic for use in the adaptive filter of FIG. 5.

When adaptive filter 500 is operating as an echo canceler for collision detection during signal transmission, error signal 532 is analyzed to detect an interfering signal 220. Packet collision detection logic 600, shown in FIG. 6, comprises two exemplary measurements made to determine if a packet collision occurs. One measurement involves analyzing the peak error measurement. Peak error measurement comprises multiplier 654 and adder 636 for comparing peak error with peak error threshold 638. Error signal 632 is squared by multiplier 654. Peak error signal 634 is then checked to see if it is higher than a peak error threshold 638. Peak error threshold 638 is subtracted from peak error signal 634 by way adder 636. If peak error output 640 is greater than zero, then a collision is detected.

Also, another detection criterion may be used to analyze the energy of error signal 632 over time. Error energy measurement comprises an accumulator for accumulating error energy. An error energy may be accumulated by using unit delay 644 and adder 642. Unit delay 644 is cleared at the beginning of the collision detection. The error energy may be accumulated some length of time. For example, the error energy may be accumulated until the end of the packet header. After a pre-determined accumulation duration is reached, error energy threshold 650 is subtracted from error energy 646 by way of adder 648. If error energy output 652 is greater than zero, then a collision is detected.

Peak error output 640 and error energy output 652 can be used separately, such that if either one is greater than its respective threshold, then a collision is detected. Alternatively, peak error output 640 and error energy output 652 can be used in conjunction, such that if both are greater than their respective thresholds, then a collision is detected.

Figure 7:
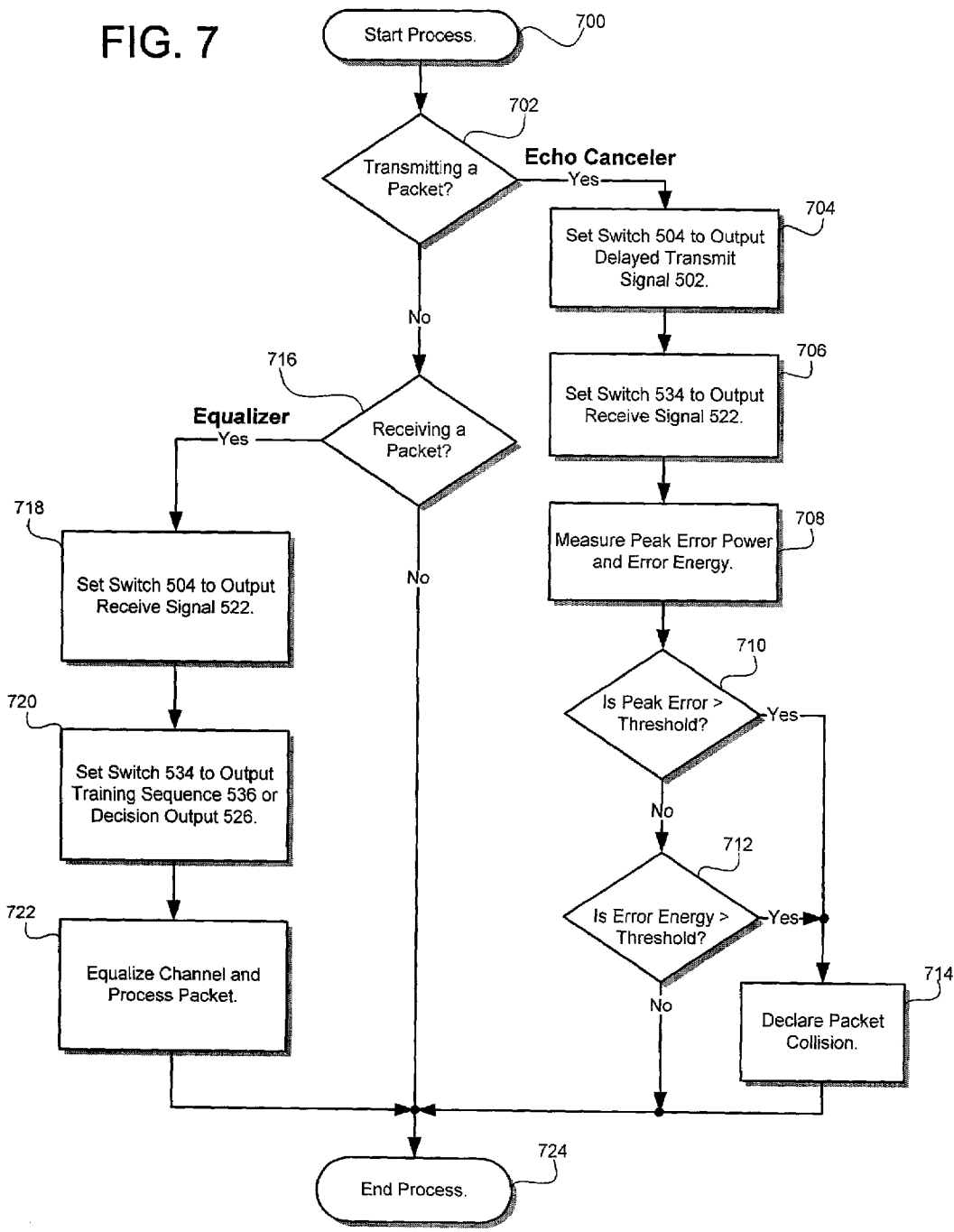
FIG. 7 illustrated an exemplary flow diagram for operating the adaptive filter of FIG. 5.

FIG. 7 illustrates one embodiment that uses either peak error output 640 or error energy output 652 to decide when a collision is detected. FIG. 7 depicts a flow diagram of adaptive filter 500 operation. As shown, flow diagram 700 starts at step 701. In step 702, flow diagram 700 determines if a packet is being transmitted or not. If a packet is being transmitted, flow diagram 700 proceeds to step 704. Otherwise, flow diagram 700 proceeds to step 716. In step 704 and step 706, adaptive filter 500 is configured to operate as echo canceller 400 for packet collision detection. In step 704, switch 504 is set to output delayed transmit signal 502. In Step 706, switch 534 is set to output receive signal 522. Adaptive filter 500 may additionally load a set of pre-determined filter coefficients. After step 706, flow diagram 700 proceeds to step 708.

In step 708, adaptive filter 500 measures the peak error signal 634 and error energy 646. Error signal 632 is squared by multiplier 654 to determine peak error signal 634. Peak error signal 634 is then accumulated over a duration, such as the length of the preamble, to form error energy 646. In step 710, adaptive filter 500 compares peak error signal 634 to peak error threshold 638. If peak error signal 634 is more than peak error threshold 638, then flow diagram 700 proceeds to step 714. Otherwise, flow diagram 700 proceeds to step 712. In step 712, adaptive filter 500 compares error energy 646 to error energy threshold 650. If error energy 646 is more than the error energy threshold 650, then flow diagram 700 proceeds to step 714. Otherwise, no packet collision is detected and flow diagram 700 proceeds to step 724 to end the process. In step 714, adaptive filter 500 determines that a packet collision occurred during transmission. At this point, flow diagram 700 proceeds to step 724 to end the process.

Turning to step 716, flow diagram if a packet it being received, flow diagram 700 proceeds to step 718. Otherwise, flow diagram 700 proceeds to step 724 to end the process. In step 718 and step 720, adaptive filter 500 is configured to operate as adaptive equalizer 300 for channel equalization while receiving a packet. In step 718, switch 504 is set to output received 522. In Step 720, switch 534 is set to output decision output training sequence 536 or decision output 526. If adaptive filter 500 is processing a packet preamble, then switch 534 outputs training sequence 536. Otherwise, switch 534 outputs decision output 526. Adaptive filter 500 may additionally load a set of predetermined filter coefficients. In step 722, adaptive filter 500 performs channel equalization and continues to process the packet. Lastly, flow diagram 700 proceeds to step 724 to end the process.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A device comprising:
   a first switch for receiving a transmit signal and a receive signal and outputting a filter input, wherein said filter input is multiplied by a first filter tap to generate a first product;
   a delay unit for receiving said filter input and generating a delayed filter input, wherein said delayed filter input is multiplied by a second filter tap to generate a second product;
   an adder for adding said first product with said second product and generating a filter output;
   a decision block receiving said filter output and generating a decision output; and
   a second switch for receiving said decision output, a training sequence and said receive signal and outputting a second switch output;
   wherein an error signal is generated using said filter output and said second switch output.

2. The device of claim 1, wherein said filter input is said receive signal and said second switch output is said training sequence or said decision output.

3. The device of claim 2, wherein said training sequence is a preamble.

4. The device of claim 1, wherein said filter input is said transmit signal and said second switch output is said receive signal.

5. The device of claim 4, wherein said error signal is used to generate a peak error and an error energy.

6. The device of claim 5, wherein a packet collision is declared if said peak error is higher than a peak error threshold or said error energy is higher than an error energy threshold.

7. The device of claim 4, wherein a packet collision is declared if said peak error is higher than a peak error threshold and said error energy is higher than an error energy threshold.

8. The device of claim 1, wherein said transmit signal is delayed.

9. A method of detecting a packet collision, said method comprising the steps of:
   setting a first switch to output a transmit signal;
   filtering said transmit signal to generate a filter output;
   setting a second switch to out put a receive signal;
   generating an error signal using said filter output and said receive signal;
   measuring a peak error using said error signal;
   comparing said peak error with a peak error threshold;
   measuring an error energy using said error signal;
   comparing said error energy with an error energy threshold; and
   declaring said packet collision if said peak error is higher than said peak error threshold or if said error energy is higher than said error energy threshold.

10. The method of claim 9, wherein said declaring step declares said packet collision if said peak error is higher than said peak error threshold and if said error energy is higher than said error energy threshold.

11. The method of claim 9 further comprising the step of delaying said transmit signal.

12. The method of claim 9, wherein said first switch is for receiving said receive signal and said transmit signal.

13. The method of claim 9, wherein said second switch is for receiving a training sequence, a decision output and said receive signal.

* * * * *